(12) United States Patent
Cheng et al.

(10) Patent No.: US 11,417,141 B2
(45) Date of Patent: Aug. 16, 2022

(54) IN-SCREEN FINGERPRINT IDENTIFICATION APPARATUS AND ELECTRONIC DEVICE

(71) Applicants: Beijing Xiaomi Mobile Software Co., Ltd., Nanjing Branch, Nanjing (CN); Beijing Xiaomi Mobile Software Co., Ltd., Beijing (CN)

(72) Inventors: Chih-jen Cheng, Beijing (CN); Tsang-chih Wu, Beijing (CN); Che-jui Hsu, Beijing (CN)

(73) Assignees: Beijing Xiaomi Mobile Software Co., Ltd., Nanjing Branch, Nanjing (CN); Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/632,820

(22) PCT Filed: Aug. 14, 2019

(86) PCT No.: PCT/CN2019/100560
§ 371 (c)(1),
(2) Date: Jan. 21, 2020

(87) PCT Pub. No.: WO2021/026806
PCT Pub. Date: Feb. 18, 2021

(65) Prior Publication Data
US 2022/0165081 A1 May 26, 2022

(51) Int. Cl.
*G06V 40/13* (2022.01)
*G02F 1/1333* (2006.01)
(Continued)

(52) U.S. Cl.
CPC ...... *G06V 40/1318* (2022.01); *G02F 1/13338* (2013.01); *G02F 1/133524* (2013.01); *G06F 3/0412* (2013.01); *G06V 40/1329* (2022.01)

(58) Field of Classification Search
CPC ............ G06V 40/1318; G06V 40/1329; G02F 1/13338; G02F 1/133524; G06F 3/0412
See application file for complete search history.

(56) References Cited

U.S. PATENT DOCUMENTS

| 2017/0109561 A1 | 4/2017 | Wyrwas et al. |
| 2018/0005005 A1 | 1/2018 | He et al. |
| 2018/0365475 A1 | 12/2018 | Lee et al. |

FOREIGN PATENT DOCUMENTS

| CN | 106873284 A | 6/2017 |
| CN | 206400572 U | 8/2017 |

(Continued)

OTHER PUBLICATIONS

Office Action and Search Report of Russian Application No. 2020109132, dated Nov. 2, 2020.

(Continued)

*Primary Examiner* — Abhishek Sarma
(74) *Attorney, Agent, or Firm* — Finnegan, Henderson, Farabow, Garrett & Dunner, L.L.P.

(57) ABSTRACT

An in-screen fingerprint identification apparatus includes a display panel and a fingerprint identification module. The display panel includes a backlight module, a liquid crystal layer, and a cover glass, which are sequentially stacked. The cover glass includes a fingerprint identification area. The fingerprint identification module includes a light source, a photosensor, and light guiding layers disposed on the cover glass. The light guiding layers at least cover portions of opposite sides of the cover glass, respectively, such that light emitted by the light source after being reflected in the cover glass is guided to the fingerprint identification area. The photosensor is disposed in the display panel and corresponds to the fingerprint identification area to receive an optical signal of the light source emitted by the light source after (Continued)

being reflected by a finger in the fingerprint identification area.

20 Claims, 3 Drawing Sheets

(51) Int. Cl.
  *G06F 3/041* (2006.01)
  *G02F 1/1335* (2006.01)

(56) References Cited

FOREIGN PATENT DOCUMENTS

| CN | 107886038 A | 4/2018 | | |
|---|---|---|---|---|
| CN | 108520240 A | 9/2018 | | |
| CN | 108615005 A | 10/2018 | | |
| CN | 208654763 U | 3/2019 | | |
| CN | 208985184 U | 6/2019 | | |
| CN | 209168144 U | 7/2019 | | |
| JP | 2018087973 A | 6/2018 | | |
| JP | 2018088248 A | 6/2018 | | |
| JP | 2019117619 A | 7/2019 | | |
| KR | 20150131944 A | 11/2015 | | |
| RU | 2627926 C1 | 8/2017 | | |
| RU | 2682921 C1 | 3/2019 | | |
| WO | WO-2017067075 A1 * | 4/2017 | ............... | G06K 9/00 |

OTHER PUBLICATIONS

International Search Report for PCT/CN2019/100560, dated Apr. 24, 2020.
Examination Report for Indian Application No. 202027002870, dated Mar. 29, 2022.
Notice of Reasons for Refusal for Japanese Application No. 2019-563898, dated Jan. 11, 2022.

* cited by examiner

IN-SCREEN FINGERPRINT IDENTIFICATION APPARATUS AND ELECTRONIC DEVICE

CROSS REFERENCE TO RELATED APPLICATIONS

This application is a national phase application based on PCT/CN2019/100560, filed Aug. 14, 2019, the entire content of which is incorporated herein by reference.

TECHNICAL FIELD

The present disclosure relates to the field of biometrics, and in particular, to an in-screen fingerprint identification apparatus and an electronic device.

BACKGROUND

With the advent of the full screen era, the in-screen fingerprint identification (recognition) technology is developed. At present, the in-screen fingerprint identification is mainly applied to organic light-emitting diode (OLED) screens. The principle is that the fingerprint identification module in the OLED screen utilizes the light transmission characteristic of the OLED panel itself, so as to receive the light irradiated by the OLED screen and reflected by the finger to detect the fingerprint.

However, since the liquid crystal display (LCD) screen has a different lighting principle and structure from those of the OLED screen, the backlight module of the LCD screen is opacity. Therefore, the fingerprint identification scheme in the OLED screen is not applicable to the LCD screen.

Therefore, it is desired to realize optical fingerprint identification in LCD screen in the art.

SUMMARY

In view of this, the present disclosure proposes an in-screen fingerprint identification apparatus and an electronic device applicable to an LCD panel to solve the above technical problems.

According to a first aspect of the present disclosure, an in-screen fingerprint identification apparatus is provided. The in-screen fingerprint identification apparatus comprises a display panel and a fingerprint identification module. The display panel comprises a backlight module, a liquid crystal layer, and a cover glass, which are sequentially stacked. Moreover, the cover glass comprises a fingerprint identification area, and the fingerprint identification module comprises a light source, a photosensor, and light guiding layers disposed on the cover glass.

Wherein the light guiding layers at least cover portions of opposite sides of the cover glass, such that light emitted by the light source after being reflected in the cover glass is guided to the fingerprint identification area; and the photosensor is disposed in the display panel and corresponds to the fingerprint identification area to receive an optical signal of the light source emitted by the light source after being reflected by the finger in the fingerprint identification area.

According to a second aspect of the present disclosure, an electronic device is provided. The electronic device comprises an in-screen fingerprint identification apparatus, and the in-screen fingerprint identification apparatus comprises a display panel and a fingerprint identification module, wherein the display panel comprises a backlight module, a liquid crystal layer and a cover glass which are sequentially stacked. Moreover, the cover glass comprises a fingerprint identification area, and the fingerprint identification module comprises a light source, a photosensor, and light guiding layers disposed on the cover glass.

Wherein the light guiding layers at least cover portions of opposite sides of the cover glass, respectively, such that light emitted by the light source after being reflected in the cover glass is guided to the fingerprint identification area; and the photosensor is disposed in the display panel and corresponds to the fingerprint identification area to receive an optical signal of the light source emitted by the light source after being reflected by the finger in the fingerprint identification area.

The technical solutions provided by the embodiments of the present disclosure may include the following beneficial effects. The present disclosure designs an in-screen fingerprint identification apparatus and an electronic device. The in-screen optical fingerprint detection is achieved through providing the fingerprint identification module in the display panel having the backlight module. The light source of the fingerprint identification module is guided to the fingerprint identification area on the cover glass by the light guiding layers covering the cover glass, and then received by the photosensitive device after being reflected by the finger. In the present disclosure, due to the light guiding layers provided on the cover glass, the light emitted by the light source travels via reflection in the cover glass to achieve the light signal detection circuit, such that the in-screen optical fingerprint identification for LCD is achieved.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure. Those skilled in the art would appreciate that other drawings may be obtained through the current drawings without any creative work.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with some aspects related to the disclosure as recited in the appended claims.

Embodiments of the present disclosure will be described in detail below with reference to the accompanying drawings, and the following embodiments and features in the embodiments may be combined with each other without conflictions.

Figure 1:
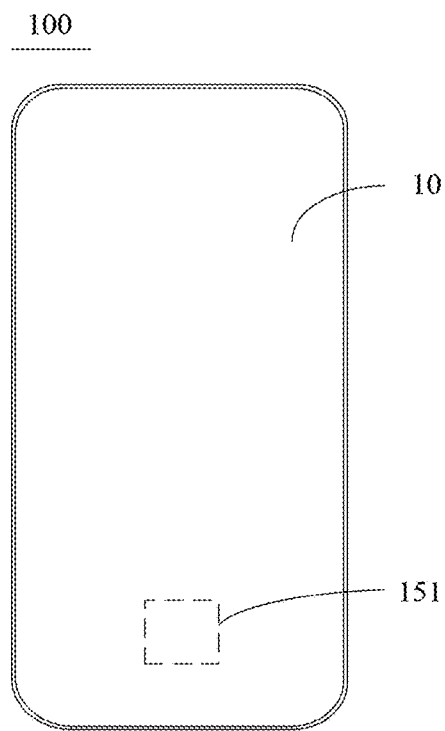
FIG. 1 is a schematic structural view of an electronic device according to an exemplary embodiment of the present disclosure.

As shown in FIG. 1, the in-screen fingerprint identification apparatus of the embodiments of the present disclosure can be applied to various electronic devices 100, and specifically to an electronic device 100 having a display screen, for example, portable or mobile computer devices such as smart phones, notebook computers, tablets, game devices, and other electronic devices such as electronic databases, automobiles, automated teller machines (ATMs), etc. Embodiments of the present disclosure are not limited to the above examples, and a smart phone is shown as an example in the drawings.

The in-screen fingerprint identification apparatus includes a display panel 10 and a fingerprint identification module. The display panel 10 may be a liquid crystal display (LCD) or other passive light-emitting display. For instance, the display panel 10 may be a touch screen. The display panel 10 may not only display the screen but also detect a touch or press operation of a user, thereby providing the user with a human-computer interaction interface. For example, in an embodiment, the display panel 10 may include a touch sensor, and the touch sensor may be such as a touch panel (TP), which may be disposed on the surface of the display screen, and may be partially or completely integrated with the screen so as to form a touch screen.

Figure 2:
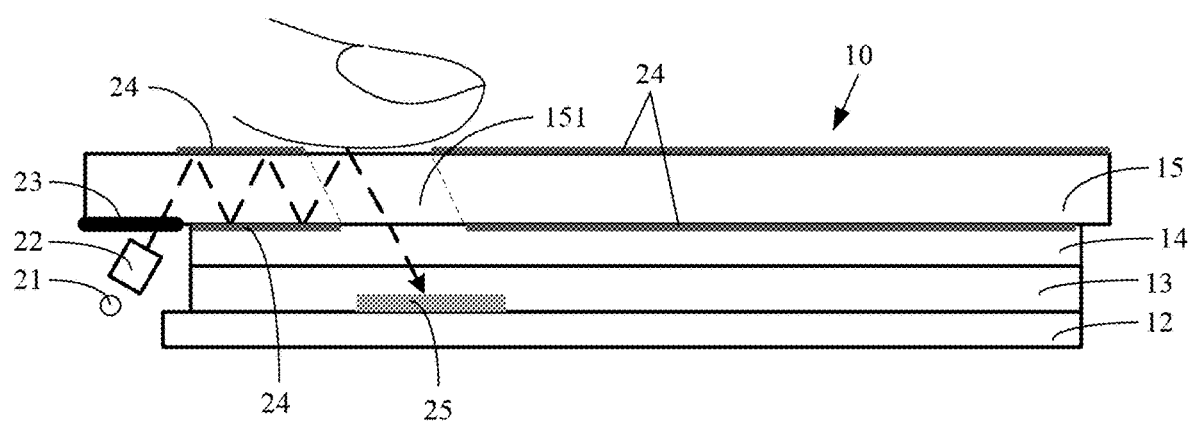
FIG. 2 is a schematic structural view of an in-screen fingerprint identification apparatus according to an exemplary embodiment of the present disclosure.

As shown in FIG. 2, the display panel 10 includes a backlight module (not shown), a thin film transistor (TFT) layer 12, a liquid crystal layer 13, and a cover glass 15, which are sequentially stacked. The TFT layer 12 serves to drive the liquid crystal layer 13. It should be appreciated that the display panel 10 of the present disclosure is not limited to those structural layers, and may include a further structural layer such as a polarizer, an ITO transparent conductive layer, and a plastic frame according to the use requirements.

The cover glass 15 of the present disclosure includes a fingerprint identification area 151, which is a light-transmitting area for the user to press the fingerprint correspondingly, so that the fingerprint identification module can identify the fingerprint. The fingerprint identification area 151 can be disposed at any position of the cover glass 15 according to the use requirement, and the cover glass 15 is a transparent protective cover.

The fingerprint identification module includes a light source 21, a photosensor 25, and light guiding layers 24 disposed on the cover glass 15. The light guiding layers 24 at least cover opposite sides of the partial cover glass 15, respectively, so as to guide the light emitted by the light source 21 to the fingerprint identification area 151 after being reflected in the cover glass 15. In this embodiment, the light source 21 may be an infrared light source, and the infrared light source may be an infrared LED light source, an infrared vertical cavity surface emitting laser, an infrared laser diode, or the like. It should be appreciated, in other embodiments, the light source 21 can also be other visible light.

In an embodiment, the light guiding layers 24 cover the light reflecting points on the opposite sides of the cover glass 15, such that the light emitted by the light source 21 may be guided to the fingerprint identification area 151 after being reflected in the cover glass 15. The position of the light reflection point is related to the angle between the cover glass 15 and the incident light from the light source 21. The position of the light reflection point on the cover glass 15 may be calculated through the angle between the incident light and the cover glass 15 as well as the thickness of the cover glass 15. In another preferred embodiment, the light guiding layers 24 may be disposed on the cover glass 15 and have an opening corresponding to the fingerprint identification area 151, that is, both sides of the cover glass 15 except the fingerprint identification area 151 is covered by the light guiding layers 24, such that the display panel 10 has a display effect of uniform color tone, thereby avoiding visual chromatic aberration and affecting the viewing effect.

In an embodiment of the present disclosure, the light emitted by the light source 21 is reflected by 2n times and directed to the fingerprint identification area 151, where n is a natural number greater than or equal to 1. Since the user presses his finger on the upper surface of the cover glass 15 during fingerprint identification, the light emitted by the light source 21 should be reflected by 2n times to be irradiated to the finger. For instance, the light emitted from the light source 21 is incident into the cover glass 15 from the lower surface of the cover glass 15, preferably reflected on the upper surface of the cover glass 15, and then reflected toward the lower surface of the cover glass 15 again, and reflected toward the upper surface of the cover glass 15, so reciprocating.

It should be noted that the upper surface and the lower surface of the cover glass 15 is defined by the display panel 10 based on the light exiting direction. For instance, a side of the cover glass 15 near the backlight module is a lower surface, and a side away from the backlight module is an upper surface.

Wherein the refractive index of the light guiding layer 24 lies between the refractive index of the cover glass 15 and the refractive index of the air. As a result, the light guiding layer 24 may satisfy the requirement that the light may be total reflected and limited within the cover glass 15. Further, the incident angle of the light emitted by the light source 21 and the light guiding layer 24 should be greater than the critical angle of the light guiding layer 24. The incident angle of the light to the light guiding layer is the angel between emitted light of the light source 21 and the light guiding layer 24 in the cover glass 15. As a result, the light of the light source 21 can be totally reflected in the cover glass 15 through the cooperation of the light guiding layer 24 in the present disclosure. Due to the light guiding layer 24, the total reflection of light is not affected by some unevenness or particles on the surface of the cover glass 15.

The photosensor 25 of the present disclosure is disposed in the display panel 10 and corresponds to the fingerprint identification area 151 to receive an optical signal of the light emitted by the light source 21 after being reflected by the finger in the fingerprint identification area 151. For instance, since the incident light of the light source 21 at the cover glass 15 is at an angle to the cover glass 15 and the cover glass 15 has a certain thickness, the fingerprint identification area 151 is generally inclined. The angle between the center line of the fingerprint identification area 151 and the cover glass 15 is complementary to the angle between the incident light of the light source 21 and the cover glass 15. Correspondingly, the center point of the photosensor 25 is located on the center line of the fingerprint identification area 151.

Further, the photosensor 25 is also configured to generate fingerprint information of the finger according to the received optical signal. Therefore, when the user wishes to unlock the electronic device or to do other fingerprint verification, the user only needs to press the finger on the fingerprint identification area 151 of the cover glass 15 to realize the fingerprint input through the function of the fingerprint identification module in the screen, such that the full screen solution is available.

It should be appreciated, the technical solution of the embodiments of the present disclosure may perform other biometrics, such as the biometric identification, in addition to the fingerprint identification, and the embodiments of the present disclosure are not limited thereto.

In an embodiment of the present disclosure, the size of the cover glass 15 is larger than the size of the liquid crystal layer 13, and the light source 21 is located below the cover glass 15 beyond the liquid crystal layer 13, such that the light source 21 will not affect the display of the liquid crystal layer 13. In this embodiment, the light source 21 is disposed at the edge of the display panel 10, and is located at the side end of the liquid crystal layer 13 and/or the TFT layer 12, or the side ends of other structural layers, such that the light source 21 may be prevented from affecting the display area in the display panel 10.

It should be appreciated, in other embodiments, the light source 21 may be disposed between the liquid crystal layer 13 and the backlight module according to the layout requirements of the display panel 10. For instance, the light source 21 may be disposed between the liquid crystal layer 13 and the TFT layer 12 or between the TFT layer 12 and the backlight module.

The fingerprint identification module further includes a collimator 22 disposed between the light source 21 and the cover glass 15, and the collimator 22 is also located below the cover glass 15 beyond the liquid crystal layer 13, such that the collimator 22 is prevented from effecting the display of the display panel 10. For instance, the collimator 22 may be disposed at the side ends of the liquid crystal layer 13 and/or the TFT layer 12, or at the side ends of other structural layers. The light emitted by the light source 21 is collimated by the collimator 22 and then directed to the cover glass 15, and the collimator 22 serves to convert the divergent light emitted by the light source 21 into parallel light, such that the optical signal is received by photosensor 25 at maximum effectiveness.

Figure 3:
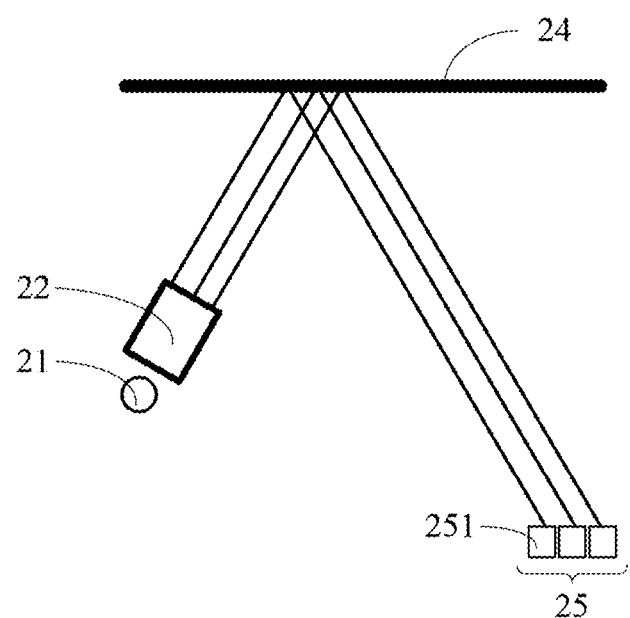
FIG. 3 is a schematic structural diagram of a fingerprint identification module in an in-screen fingerprint identification apparatus according to an exemplary embodiment of the present disclosure.

As shown in FIG. 3, the photosensor 25 includes various optical sensors 251 for receiving the corresponding light of different paths emitted from the light source 21. The light of the different paths may have different colors or wavelengths. In this embodiment, various types of optical sensors 251 are provided to receive light of different optical paths, such that the light collimated by the collimator 22 may be collimated and unmixed.

In addition, referring again to FIG. 2, when the light source 21 is an infrared light source, the fingerprint identification module further includes an infrared permeable film 23 attached to the cover glass 15. The infrared permeable film 23 is disposed on the incident side of the cover glass 15 corresponding to the light source 21, that is, on the lower surface of the cover glass 15 at the portion beyond the liquid crystal layer 13. Due to the design of the infrared permeable film 23, other stray light may be filtered out, and only the infrared light may be transmitted into the cover glass 15. The infrared permeable film may be an infrared ink.

In the present disclosure, the refractive index of the light guiding layer 24 and the cover glass 15 and the light incident angle of the light source 21 are designed such that the light emitted by the light source 21 should be collimated by the collimator 22 and then passed through the infrared permeable film 23. Through the cooperation of the light guiding layer 24, the incident light is totally reflected in the cover glass 15 to reach the fingerprint identification area 151. When the finger is pressed on the fingerprint identification area 151, the light path, through the total reflection of the finger valley and the absorption of the finger ridge, will form a strong contrast light intensity. This signal will enter the photosensor 25 in the display panel 10 through the same angle, such that the light signal is collected by the photosensor 25, thus achieving fingerprint imaging.

The position of the photosensor 25 is further defined in the present disclosure.

In an embodiment, the photosensor 25 of the present disclosure is located between the TFT layer 12 and the liquid crystal layer 13. The specific position of the photosensor 25 is provided according to the angle of the incident light of the light source 21 and the reflection path in the cover glass 15, such that signal reflected by the finger is finally received by the photosensor 25.

In another embodiment, the display panel 10 further includes a color filter 14 disposed between the liquid crystal layer 13 and the cover glass 15. The photosensor 25 is located between the liquid crystal layer 13 and the color filter 14 or may be located between the color filter 14 and the cover glass 15. The specific position of the photosensor 25 is provided according to the angle of the incident light of the light source 21 and the reflection path in the cover glass 15, such that signal reflected by the finger is finally received by the photosensor 25.

Figure 4:
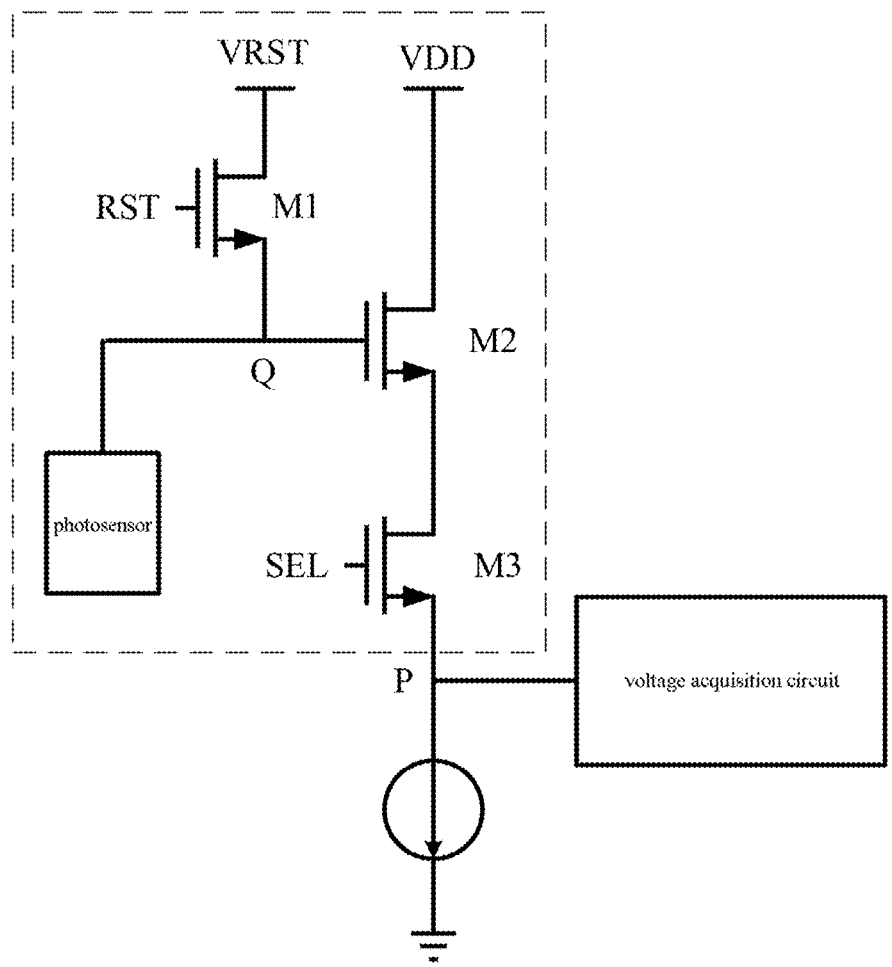
FIG. 4 is a circuit diagram of a photosensitive device for signal collection in an in-screen fingerprint identification apparatus according to an exemplary embodiment of the present disclosure.
Figure 5:
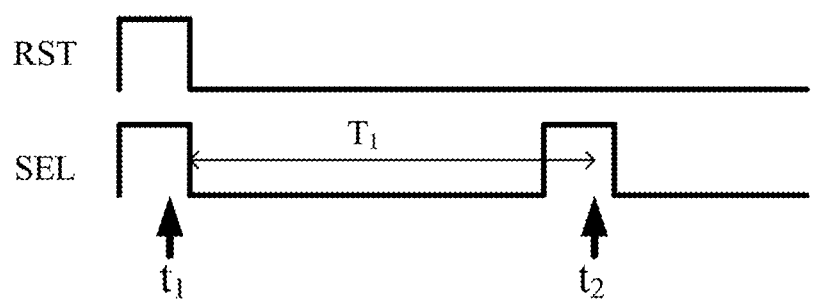
FIG. 5 is a schematic diagram of the pulse signal of the circuit diagram in FIG. 4.

As shown in FIG. 4 and FIG. 5 in combination with FIG. 2, the fingerprint identification module further includes a signal detecting circuit electrically connected to the photosensor 25. The signal detecting circuit cooperates with the detecting photosensor 25 to obtain the light signal received by the photosensor 25. For instance, the signal detecting circuit includes a first transistor M1, a second transistor M2, and a third transistor M3. Wherein the gate G of the first transistor M1 is connected to the reset signal, the drain D of the first transistor M1 is connected to the reset voltage, the source S of the first transistor M1 is connected to the photosensor 25; the gate G of the second transistor M2 is connected to the photosensor 25, the drain D of the second transistor M2 is connected to the power supply voltage, the source S of the second transistor M2 is connected to the drain D of the third transistor M3; the gate G of the third transistor M3 is connected to the selection signal, and the source S of the third transistor M3 is connected to the voltage collecting circuit and the ground, respectively. Wherein the first transistor M1 and the third transistor M3 are used as switches.

When the photosensor 25 performs optical signal detection, the drain G of the first transistor M1 receives the reset voltage to reset the photosensor 25. Meanwhile, at a time t1, the voltage of the P point is read by the voltage collecting circuit (the voltage at the point P will react to the voltage at the Q point via M2), and after the light accumulation at the time T1, the third transistor M3 is turned on again at t2 to read the voltage at the P point. The voltage is finally obtained by subtracting the voltages at these two times to obtain a cumulative optical signal. The design of the signal detection circuit allows great flexibility in the control of reset and read timing.

The present disclosure designs an in-screen fingerprint identification apparatus and an electronic device. The optical identification of the in-screen is performed by providing the fingerprint identification module in the display panel having a backlight module. The light source of the fingerprint identification module is guided into the fingerprint identification area on the cover glass by the light guiding layers covering the cover glass, and then received by the photosensor after being reflected by the finger. The photosensor generates fingerprint information of the finger based on the received light signal. In addition, through the architectural design of the signal detection circuit of photosensor, great flexibility in the control of reset and read timing for fingerprint identification is allowed. In the present invention, through the light guiding layers disposed on the cover glass, the light emitted by the light source is reflected in the cover glass for light propagation to realize the detection circuit of the optical signal, such that the in-screen fingerprint identification for LCD is available.

It should be noted that, in this context, relational terms such as first and second, etc. are only used to distinguish one entity or operation from another entity or operation, and do not necessarily require or imply such actual relationship or order between these entities or operations. The terms "include," "comprise," or their variations are intended to include a non-exclusive inclusion, such that a process, method, article, or device that comprises a plurality of elements including not only those elements but also other items not specifically listed, or elements that are inherent to such a process, method, item, or device. An element that is defined by the phrase "comprise a . . . " does not exclude the presence of additional equivalent elements in the process, method, item, or device that comprises the element.

The method and apparatus provided by the embodiments of the present invention are described in detail above. The principles and embodiments of the present invention are described through specific examples. The description of the above embodiments is only for understanding the method and ideas of the present invention. At the same time, for those of skilled in the art, in accordance with the idea of the present invention, there may be variations in specific embodiments and applications. In summary, the content of the specification should not be construed as limiting the invention.

What is claimed is:

1. An in-screen fingerprint identification apparatus, comprising:
    a display panel and a fingerprint identification module, the display panel comprising a backlight module, a liquid crystal layer and a cover glass which are sequentially stacked, and the cover glass comprising a fingerprint identification area, the fingerprint identification module comprising a light source, a photosensor, and light guiding layers disposed on the cover glass;
    wherein the light guiding layers at least cover portions of opposite sides of the cover glass, respectively, such that light emitted by the light source after being reflected in the cover glass is guided to the fingerprint identification area; and the photosensor is disposed in the display panel and corresponds to the fingerprint identification area to receive an optical signal of the light source emitted by the light source after being reflected by a finger in the fingerprint identification area.

2. The in-screen fingerprint identification apparatus according to claim 1, wherein the light emitted by the light source is reflected to the fingerprint identification area after 2n reflections, and n is a natural number greater than or equal to 1.

3. The in-screen fingerprint identification apparatus according to claim 2, wherein a refractive index of each of the light guiding layers lies between a refractive index of the cover glass and an air refractive index, and an incidence angle of the light emitted by the light source to a light guiding layer is greater than a critical angle of the light guiding layer.

4. The in-screen fingerprint identification apparatus according to claim 1, wherein the light guiding layers cover light reflection points on the opposite sides of the cover glass.

5. The in-screen fingerprint identification apparatus according to claim 1, wherein the light guiding layers cover the cover glass and have an opening corresponding to the fingerprint identification area.

6. The in-screen fingerprint identification apparatus according to claim 1, wherein the display panel further comprises a thin film transistor (TFT) layer for driving the liquid crystal layer, and the photosensor is located between the TFT layer and the liquid crystal layer.

7. The in-screen fingerprint identification apparatus according to claim 1, wherein the display panel further comprises a color filter disposed between the liquid crystal layer and the cover glass, and the photosensor is located between the liquid crystal layer and the color filter.

8. The in-screen fingerprint identification apparatus according to claim 1, wherein the display panel further comprises a color filter disposed between the liquid crystal layer and the cover glass, and the photosensor is located between the color filter and the cover glass.

9. The in-screen fingerprint identification apparatus according to claim 1, wherein the photosensor comprises various optical sensors for receiving light of different paths corresponding to the light source.

10. The in-screen fingerprint identification apparatus according to claim 1, wherein a size of the cover glass is larger than a size of the liquid crystal layer, and the light source is located below the cover glass beyond the liquid crystal layer.

11. The in-screen fingerprint identification apparatus according to claim 10, wherein the fingerprint identification module further comprises a collimator disposed between the light source and the cover glass, the collimator is located below the cover glass beyond the liquid crystal layer, and the light emitted by the light source is collimated by the collimator and directed to the cover glass.

12. The in-screen fingerprint identification apparatus according to claim 10, wherein when the light source is an infrared light source, the fingerprint identification module further includes an infrared permeable film attached to the cover glass, and the infrared permeable film is correspondingly disposed on an incident side of the cover glass into which the light source irradiates.

13. The in-screen fingerprint identification apparatus according to claim 1, wherein the fingerprint identification module further comprises a signal detecting circuit electrically connected to the photosensor, the signal detecting circuit comprising a first transistor, a second transistor, and a third transistor;
    wherein a gate of the first transistor is connected to a reset signal, a drain of the first transistor is connected to a reset voltage, and a source of the first transistor is connected to the photosensor;
    a gate of the second transistor is connected to the photosensor, a drain of the second transistor is connected to a power supply voltage, and a source of the second transistor is connected to a drain of the third transistor; and
    a gate of the third transistor is connected to a selection signal, a source of the third transistor is connected to a voltage acquisition circuit and a ground, respectively.

14. An electronic device, comprising:
an in-screen fingerprint identification apparatus, the in-screen fingerprint identification apparatus comprising a display panel and a fingerprint identification module, the display panel comprising a backlight module, a liquid crystal layer and a cover glass which are sequentially stacked, the cover glass comprising a fingerprint identification area, and the fingerprint identification module comprising a light source, a photosensor, and light guiding layers disposed on the cover glass;
wherein the light guiding layers cover at least portions of opposite sides of the cover glass, respectively, such that light emitted by the light source after being reflected in the cover glass is guided to the fingerprint identification area; and the photosensor is disposed in the display panel and corresponds to the fingerprint identification area to receive an optical signal of the light source emitted by the light source after being reflected by a finger in the fingerprint identification area.

15. The electronic device according to claim 14, wherein the light emitted by the light source is reflected to the fingerprint identification area after 2n reflections, and n is a natural number greater than or equal to 1.

16. The electronic device according to claim 15, wherein a refractive index of each of the light guiding layers lies between a refractive index of the cover glass and an air refractive index, and an incidence angle of the light emitted by the light source to the light guiding layer is greater than a critical angle of the light guiding layer.

17. The electronic device according to claim 14, wherein the light guiding layers cover light reflection points on the opposite sides of the cover glass.

18. The electronic device according to claim 14, wherein the light guiding layers cover the cover glass and have an opening corresponding to the fingerprint identification area.

19. The electronic device according to claim 14, wherein the display panel further comprises a thin film transistor (TFT) layer for driving the liquid crystal layer, and the photosensor is located between the TFT layer and the liquid crystal layer.

20. The electronic device according to claim 14, wherein the display panel further comprises a color filter disposed between the liquid crystal layer and the cover glass, and the photosensor is located between the liquid crystal layer and the color filter.

* * * * *